United States Patent
Vogel et al.

(10) Patent No.: US 9,505,292 B2
(45) Date of Patent: Nov. 29, 2016

(54) SLIDING ROOF SYSTEM

(71) Applicants: Stefan Vogel, Ortenberg (DE); Stefan Kunkel, Aschaffenburg (DE); Rainer Arnold, Schotten (DE)

(72) Inventors: Stefan Vogel, Ortenberg (DE); Stefan Kunkel, Aschaffenburg (DE); Rainer Arnold, Schotten (DE)

(73) Assignee: ROOF SYSTEMS GERMANY GMBH, Dietzenbach (DE)

(*) Notice: Subject to any disclaimer, the term of this patent is extended or adjusted under 35 U.S.C. 154(b) by 0 days.

(21) Appl. No.: 13/970,166

(22) Filed: Aug. 19, 2013

(65) Prior Publication Data

US 2014/0054934 A1 Feb. 27, 2014

(30) Foreign Application Priority Data

Aug. 20, 2012 (DE) .................. 10 2012 016 504

(51) Int. Cl.
*B60J 7/043* (2006.01)
*B60J 7/19* (2006.01)

(52) U.S. Cl.
CPC .............. *B60J 7/043* (2013.01); *B60J 7/192* (2013.01)

(58) Field of Classification Search
CPC ........................................ B60J 7/192
USPC ................ 296/216.02–216.05, 224
See application file for complete search history.

(56) References Cited

U.S. PATENT DOCUMENTS 4,974,902 A * 12/1990 Huiyer .................... 296/223
5,630,641 A 5/1997 Mori et al.
7,490,894 B2 2/2009 Oechel et al.
7,784,859 B2 8/2010 Grimm et al.
2004/0021345 A1 * 2/2004 Munsters et al. ............ 296/224
2007/0138841 A1 6/2007 Oechel et al.
2009/0079234 A1 * 3/2009 Faerber .................... 296/216.05
2009/0160223 A1 6/2009 Grimm et al.

FOREIGN PATENT DOCUMENTS

| DE | 4426827 C2 | 2/1995 |
| DE | 29912977 U1 | 12/1999 |
| DE | 199 34 847 A1 | 10/2000 |
| DE | 103 33 475 A1 | 2/2004 |
| DE | 199 44 853 C5 | 2/2007 |
| DE | 10 2005 060 065 A1 | 6/2007 |
| DE | 102005037703 B4 | 8/2007 |
| DE | 102007061091 | 12/2007 |

(Continued)

OTHER PUBLICATIONS

DE19934847A1 Machine Translation.

(Continued)

*Primary Examiner* — Dennis H Pedder
(74) *Attorney, Agent, or Firm* — Cantor Colburn LLP

(57) ABSTRACT

A sliding roof system is shown having a pair of guide rails, a slide in each guide rail, the slide being displaceably mounted therein, a functional component which is displaceably received in the guide rail and can be fixed in a raised position by means of a latching hook, the latching hook being shiftable between a release position and a latching position, the latching hook when in the latching position engaging in an opening of the guide rail, and a cover which can be opened from a closed position by displacement of the slide, a retaining lever being provided which can mechanically hold the latching hook in the latching position, wherein the retaining lever is adapted to be pivoted about a pivot pin between the release position and the retaining position.

18 Claims, 16 Drawing Sheets

Section c-c

(56) References Cited

FOREIGN PATENT DOCUMENTS

DE   102006010755 B4   2/2008
EP      17980886 A2    6/2007
EP    2 072 304 A1     6/2009

OTHER PUBLICATIONS

DE19944853C5 Machine Translation.
DE102005060065A1 Machine Translation.
DE110333475A1 MachineTranslation.
English Translation of DE102005037703 Abstract, Mar. 5, 2015.
English Translation of DE102006010755 Abstract, Mar. 13, 2015.
English Translation of DE4426827 Abstract, Mar. 13, 2015.
English Translation of German Office Action for Application No. 10 2012 016 504.8 dated Aug. 7, 2013.
English Translation of Opposition dated Feb. 23, 2015 with regard to German Patent Application. 102012016504.8.
Opposition dated Feb. 23, 2015 with regard to German Patent Application. 102012016504.8.
German Office Action for Application No. 10 2012 016 504.8 dated Aug. 7, 2013.
English Translation of EP1798086 Abstract.
Office Action Issued on Apr. 13, 2016 in CN Application No. 201310364746.6.
Machine Translation for DE29912977US1.

\* cited by examiner

Section c-c

Section d-d

Section c-c

Section d-d

Section c-c

Section d-d

Section c-c

Section d-d

SLIDING ROOF SYSTEM

CROSS REFERENCE TO RELATED APPLICATIONS

This application claims priority under 35 U.S.C. §119 to the following German Patent Application No. 10 2012 016 504.8 filed Aug. 20, 2012, the contents of which are incorporated herein by reference thereto.

BACKGROUND

Various embodiments of the present invention relates to a sliding roof system including a pair of guide rails, a slide in each guide rail, the slide being displaceably mounted therein, a functional component which is displaceably received in the guide rail and can be fixed in a defined position by means of a latching hook, the latching hook being shiftable between a release position and a latching position, the latching hook when in the latching position engaging in an opening of the guide rail, and a cover which can be opened from a closed position by displacement of the slide, a retaining lever being provided which can mechanically hold the latching hook in the latching position.

The latching hook serves to releasably fix the functional component that is displaceable in the guide rail at a particular place. In this condition, the functional component can, for example, lock a raising mechanism in a defined position. When the latching hook is in its release position again, the functional component can be shifted in the guide rail again to move to an initial position, for example, or in order not to be in the way of other components during the displacement thereof.

In the operation of such a sliding roof, a thrust load develops when there is a change in the direction of travel, such thrust load being directly transferred to the component to which the latching hook is mounted. This may cause a moment to be transmitted to the latching hook. While the latching hook typically is spring-loaded so that it reliably remains within its latching opening, this moment is considered to be undesirable if it acts on the latching hook. Accordingly and in one non-limiting embodiment, it is desirable to provide a sliding roof system that prevents or mitigates the aforementioned undesirable moment.

SUMMARY OF THE INVENTION

One embodiment of the invention comprises providing a sliding roof system which distinguishes itself by a greater functional reliability with respect to the latching mechanism.

To achieve this, provision is made in a sliding roof system of the type initially mentioned that the retaining lever is adapted to be pivoted about a pivot pin between the release position and the retaining position. Such a retaining lever causes the latching hook to be mechanically retained in the latching position, so that the latching hook cannot leave the latching opening in the latched state of the sliding roof system. The pivotal mounting of the retaining lever allows the lever to be reliably mounted, requiring a small amount of space. If the pivot pin is located in the center of gravity of the retaining lever, it is furthermore ensured that any accelerations occurring do not exert a moment on the retaining lever.

In one embodiment, the slide has an actuating member provided thereon which cooperates with the retaining lever such that it can shift the retaining lever between the release position and the retaining position and back. In this configuration, no additional components are necessary for actuating the retaining lever, but the slide can actuate the retaining lever automatically in the course of its displacement motion within the guide rail.

According to at least one configuration of the invention, provision is made that the retaining lever is shiftable between a release position and a retaining position. A retaining lever is especially suitable since different lever arms can be used for shifting the retaining lever from the release position to the retaining position and back.

Provision is made that the retaining lever includes a support arm which is associated with the latching hook and is arranged in relation to the pivot pin such that a force exerted on the support arm by the latching hook urges the retaining lever to the retaining position. This results in a self-reinforcement in the retaining position when the latching hook acts on the retaining lever in terms of a disengagement from the opening. Any additional securing measures to prevent an unintentional movement of the retaining lever from the retaining position to the release position are therefore not required.

According to one configuration of the invention, provision is made that the retaining lever is acted upon by a frictional force, so that it does not unintentionally rotate from the retaining position to the release position, and vice versa. The frictional force ensures that, without further measures being required, the retaining lever remains in the position (release position or retaining position) to which it was brought, and that it cannot shift in an unintentional manner such as due to vibrations, for example.

According to one embodiment of the invention, provision is made that the actuating member is a projection which can engage in a recess of the retaining lever and can leave the recess when the retaining lever is in the retaining position. In this configuration, the retaining lever is shifted in a particularly simple way by, for example, the slide, to which the projection can be mounted.

According to one embodiment, provision is made that the opening in the guide rail is located on the side facing the cover. It has been found that by a sequence of motions that is reversed as compared with the prior art, i.e. a pivoting of the latching hook upward in order to bring it to the latching position, a structure can be obtained which, as a whole, is more compact. The reason for this is that irrespective of whether the latching hook is pivoted upward or downward, it is coupled to the slide that is displaceable in the guide rail in the upper half of the slide. In the lower region, the installation space available is usually not sufficient. Among other reasons, this is due to the fact that the guide formations are realized there, by means of which the slide is guided in the guide rail. In this way, a structure that is more compact in the vertical direction can be achieved if the latching hook is shifted from the release position to the latching position towards that side from which it is actuated, namely towards the upper side. Furthermore, the advantage is obtained that the guide rail can be produced with a continuous, uninterrupted bottom surface, which is a great advantage with a view to water tightness. This, too, results in a compact structure of the sliding roof system according to the invention, since no special precautions need to be taken for preventing water from penetrating into the area of the guide rail which, in the prior art, is provided with the opening. In accordance with non-limiting embodiments of the invention, it is sufficient to provide a water drain for the guide rail at a suitable location. Even with a latching hook that is adapted to be pivoted upward into a latching opening, owing to the retaining lever that is provided for according to the invention there is no risk that a vehicle occupant inadvertently pushes the latching hook downward (for example if he or she places his or her hand on the edge of the roof opening when the sliding roof system is open).

According to one embodiment, provision is made that the latching hook is pivotally mounted to a guide part which is displaceably received in the guide rail. The guide part is that component which is intended to be locked in place in a predetermined position in the guide rail for the desired sequence of motions when the cover is being opened.

Provision may be made here that the functional component is coupled to the guide part. This allows the functional component to be shifted in the guide rail in order to produce a lifting movement in this way, for example.

A connecting rod may be provided for the coupling between the functional component and the guide part. This connecting rod makes it possible to arrange the functional component, for example a raising lever, remote from the guide part, for example in the rear area of the guide rail, in order to allow the rear edge of a cover to be raised, while the guide part is arranged in the front area of the guide rail where it can be actuated by the slide arranged there.

In one non-limiting exemplary embodiment, a sliding roof system is provided. The sliding roof system having: a pair of guide rails; a slide in each guide rail, the slide being displaceably mounted therein; a functional component which is displaceably received in the guide rail and can be fixed in a raised position by means of a latching hook, the latching hook being shiftable between a release position and a latching position, the latching hook when in the latching position engaging in an opening of the guide rail, and a cover which can be opened from a closed position by displacement of the slide; a retaining lever being provided which can mechanically hold the latching hook in the latching position, wherein the retaining lever is adapted to be pivoted about a pivot pin between the release position and the retaining position.

BRIEF DESCRIPTION OF THE DRAWINGS

The invention will now be described below by reference to a preferred embodiment which is illustrated in the accompanying drawings, in which.

DETAILED DESCRIPTION

Figure 1:
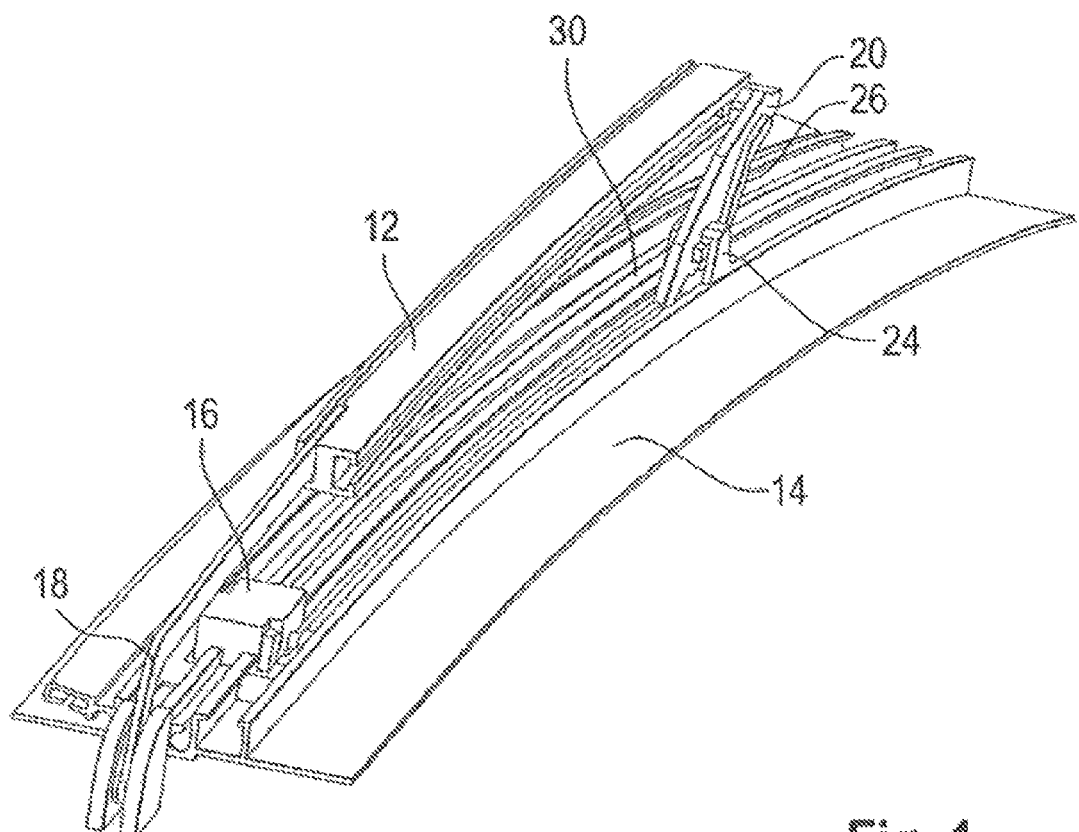
FIG. 1 shows, in a perspective view, a sliding roof system according to the prior art.

With reference to FIGS. 1 to 4, a sliding roof system as is disclosed in EP 2 072 304 A will be generally described. The contents of EP 2 072 304 A are incorporated herein by reference thereto. Reference is also made to U.S. Pat. No. 7,784,859 the contents of which are incorporated herein by reference thereto. This sliding roof system is only discussed here to convey the basic mode of operation.

The sliding roof system serves to displace a cover 10 (see FIG. 2) from a closed position, in which it closes an opening in a vehicle roof, via various intermediate positions (for instance a ventilating position) to an open position, in which the opening in the vehicle roof is essentially exposed. Mounted to the cover 10 is a cover holder 12 which is displaceably coupled to a guide rail 14 by means of various components of a raising mechanism. In practice, typically two guide rails 14 and, accordingly, two cover holders 12 are used, which both extend parallel to the direction of travel of the vehicle, substantially on the left and right sides of the cover or the roof opening.

Figure 2:
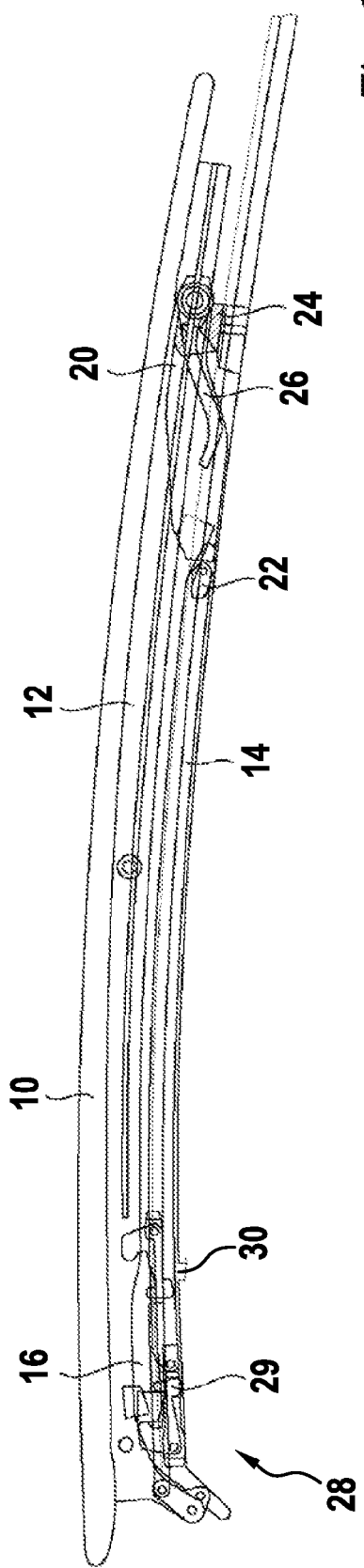
FIG. 2 shows the sliding roof system of FIG. 1 in a state with the cover closed.
Figure 3:
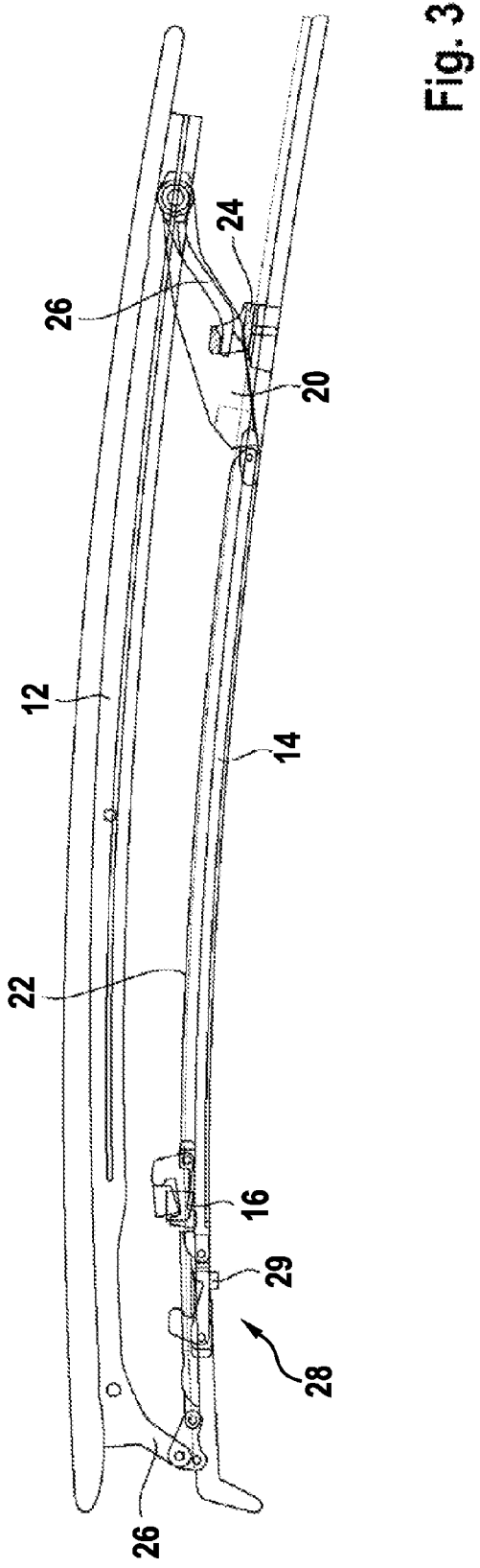
FIG. 3 shows the sliding roof system of FIG. 1 in a state with the cover tilted outwards.

For adjusting the cover holder 12 and, hence, the cover 10, provision is made for a slide 16 which is displaceably mounted in the guide rail and can be displaced along the guide rail by a drive motor (not shown) by means of a drive cable (also not shown). In the initial position or closed position of the cover 10, which is shown in FIG. 2, the slide 16 is in a forward position (in relation to the longitudinal direction of the vehicle), in which it ensures that both a guide member 18 located at the front and a raising lever 20 located at the rear are in a lowered or initial position. The raising lever 20 here constitutes the functional component initially mentioned.

When the slide, starting from the forward position, is displaced to the rear, for one thing the raising lever 20 is displaced to the rear by means of a connecting rod 22. This causes the raising lever 20 to be displaced relative to a bearing block 24 which is firmly mounted in the guide rail and to which it is coupled by a raising slot 26. This causes the rear end, coupled to the cover holder 12, of the raising lever 20 to be tilted upwards (cf. FIGS. 2 and 3). In addition, the guide member 18 located at the front is lifted, which can also be seen well by comparing FIGS. 2 and 3.

At a specific point of the movement to the rear, more specifically when the raising lever 20 has been completely tilted outwards, the slide 16 is detached from the connecting rod 22; at the same time, the front end of the connecting rod 22 is stationarily fixed in place in the guide rail 14 by a locking mechanism 28 which contains a latching hook 29 and an opening 30, associated with the latching hook, in the guide rail. As a result, the raising lever 20 is also stationarily fixed in place in the guide rail 14, so that it remains in its position raised outwards.

Figure 4:
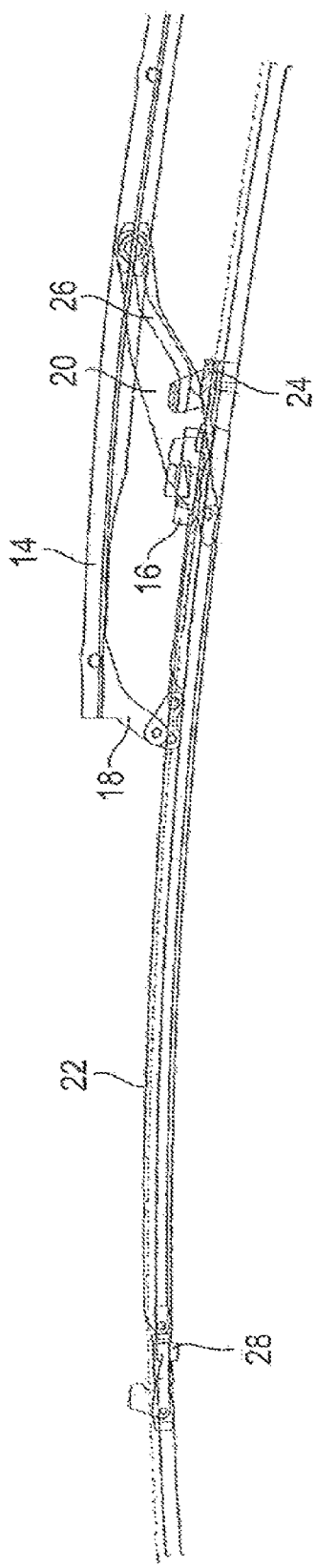
FIG. 4 shows the sliding roof system of FIG. 1 with the cover tilted and displaced to the rear.
Figure 5:
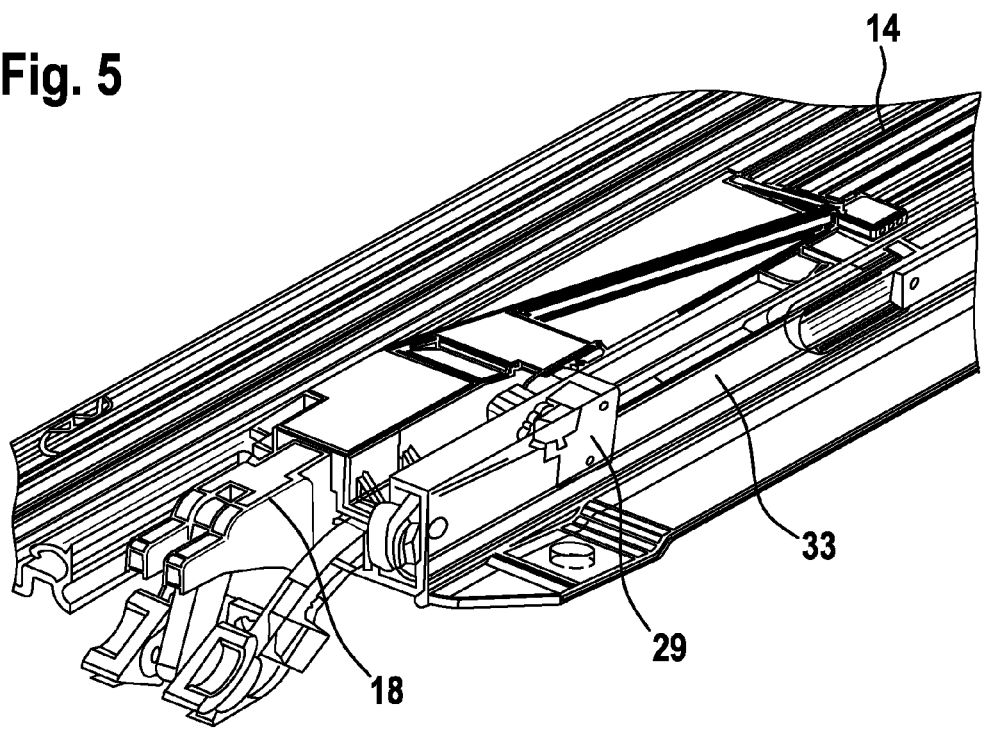
FIG. 5 shows, in a perspective view, the front section of a guide rail with the components of a sliding roof system according to the invention mounted therein.

Subsequently, the slide 16 is transferred further to the rear, with the guide member 18 located at the front being entrained. The cover holder 12 is thereby displaced relative to the upper end of the raising lever 20, so that in a position with the cover fully open, as is shown in FIG. 4, the guide member 18 located at the front is relatively close to the raising lever 20 located at the rear.

When it is intended to close the cover again, the slide 16 is shifted to the front. In this process, at first the cover 10 is entrained forward. When the slide abuts the locking mechanism 28, the latching hook 29 is released from the opening 30, and the connecting rod 22 with the raising lever 20 are pulled forward until finally the closed position is reached.

Referring now to FIGS. 5 to 13, the sliding roof system according to the invention will be explained.

In one exemplary embodiment, a difference from the sliding roof system shown in FIGS. 1 to 4 resides in that the opening 30 in the guide rail is no longer arranged on the bottom of the guide rail, but at the top of the guide rail, that is, on the side facing the cover.

The sliding roof system according to one embodiment of the invention also differs from the prior art with regard to the configuration of the latching hook 29 and the arrangement thereof on the connecting rod 22.

Figure 6:
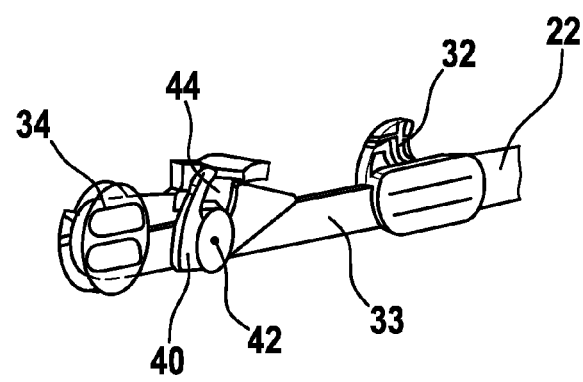
FIG. 6 shows, in a perspective view, the front end of a connecting rod with latching hook and retaining lever.
Figure 7:
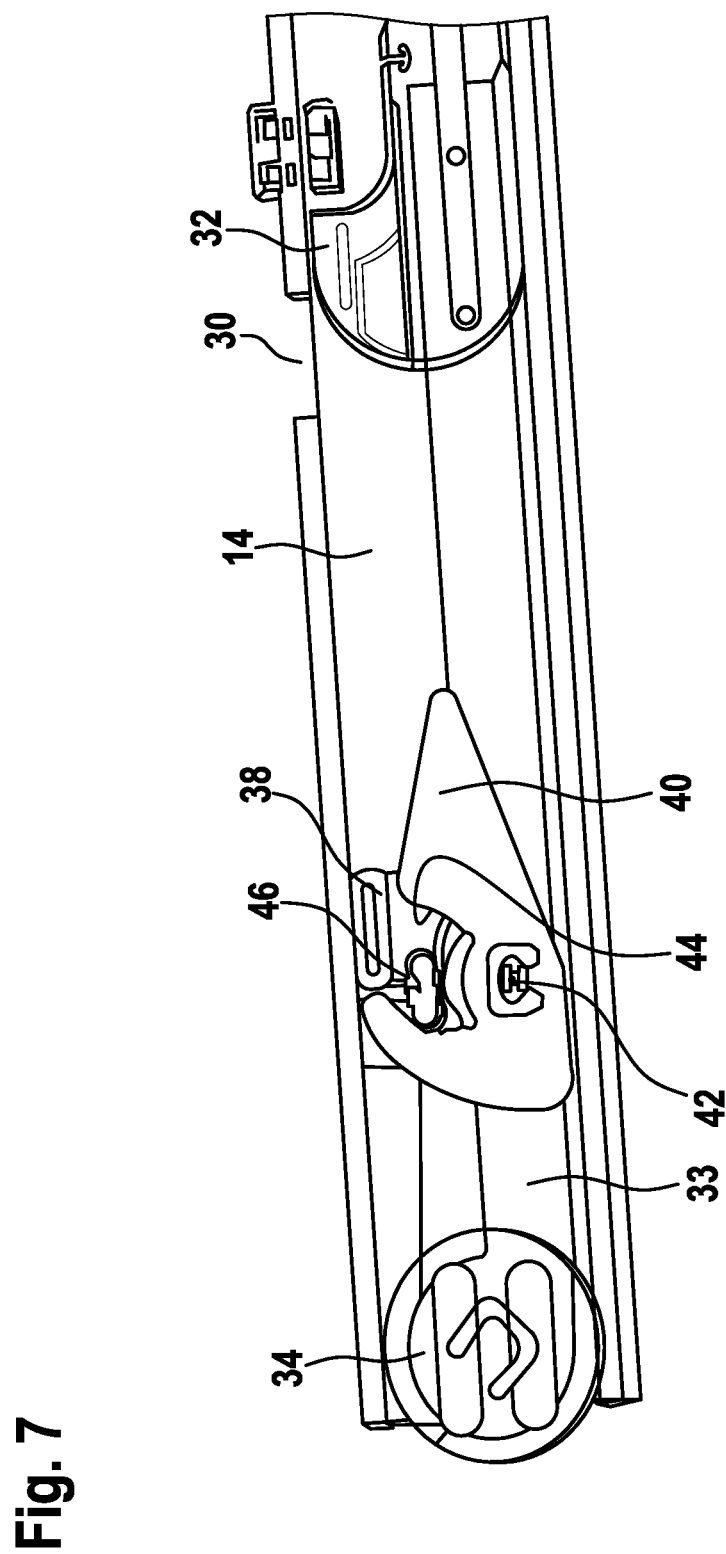
FIG. 7 shows, in a side view, the front end of the connecting rod with latching hook and retaining lever mounted in a guide rail.
Figure 8:
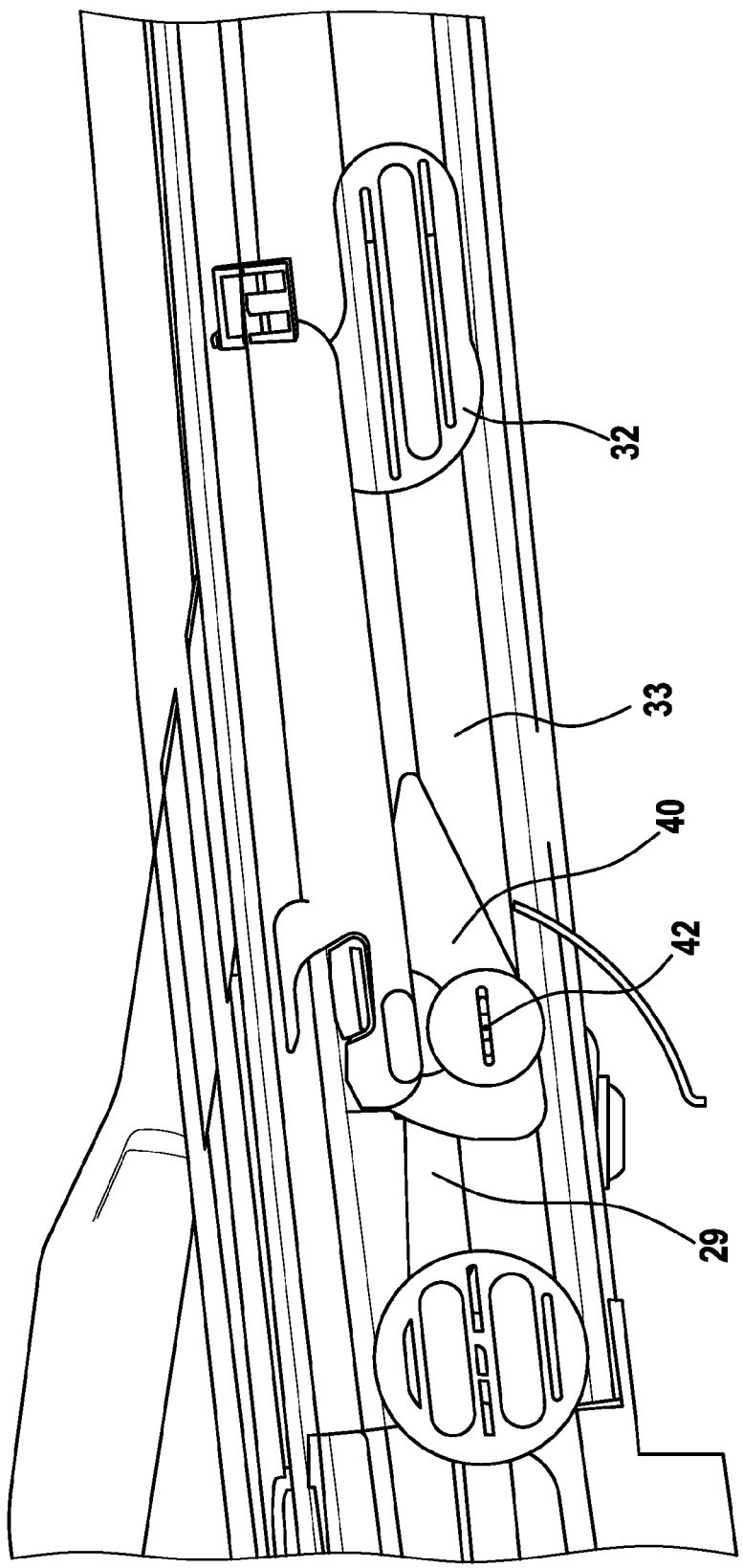
FIG. 8 shows a view corresponding to that of FIG. 7, with further components being shown.

As can be seen in particular in FIGS. 6 and 7, the connecting rod 22 is guided in the guide rail 14 by means of a guide part 32. In the region of the guide part 32, an extension 33 of the connecting rod 22 is connected with the latter, the extension 33 being pivotally coupled to the connecting rod 22. At its second end, the extension 33 is mounted in the guide rail 14 by means of a guide part 34. At this end of the extension, the latching hook 29 is also pivotally fitted. The latching hook 29 can be pivoted from a release position, in which a latching member 38 arranged on it is located below the upper level of the guide rail 14 (see in particular FIGS. 7 and 8), to a latching position, in which the latching member 38 engages in the opening 30 (see in particular FIG. 9).

Figure 9:
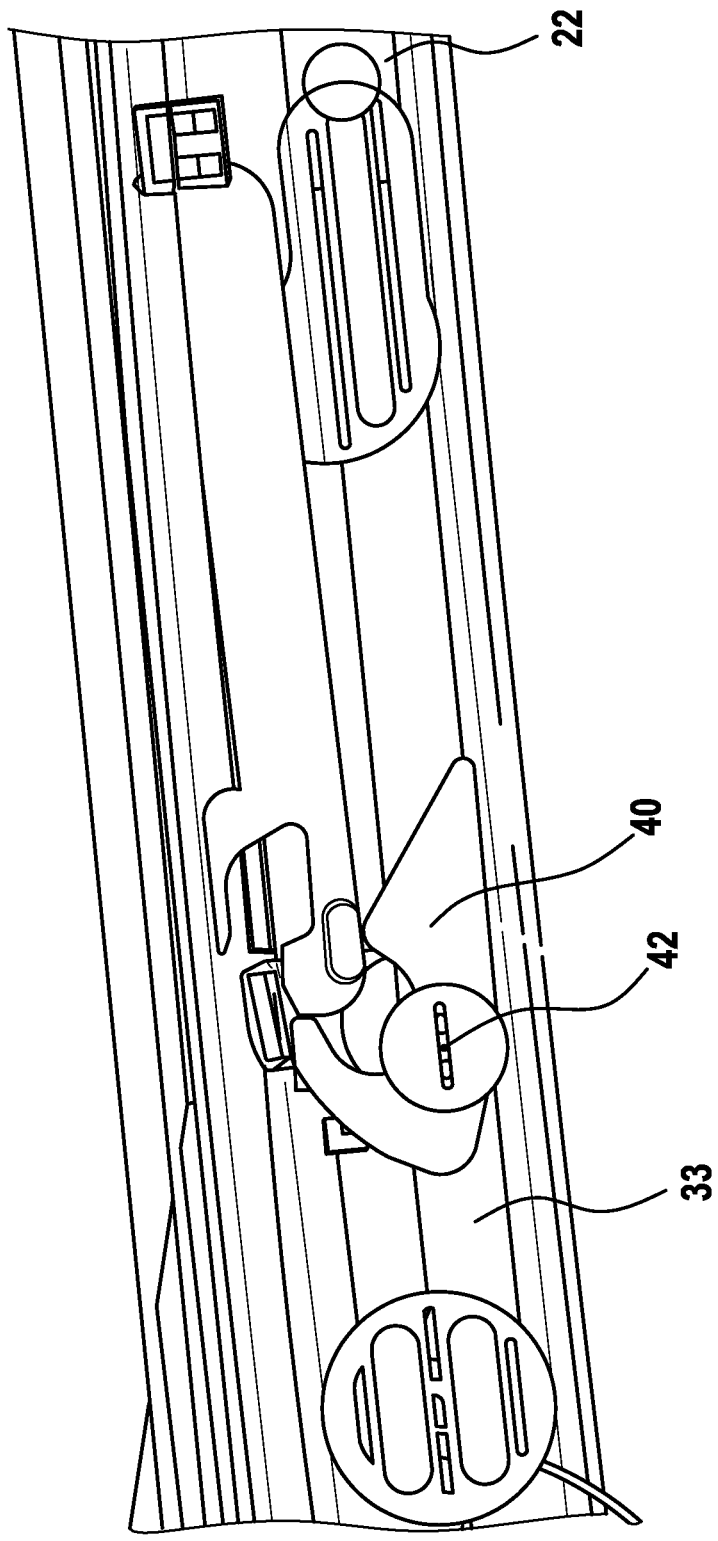
FIG. 9 shows a view similar to that of FIG. 8, with the latching hook being in the latching position.

Also mounted to the connecting rod 22 is a retaining lever 40, which here is in the form of a retaining lever which can be pivoted about a pivot pin 42 between a release position (see in particular FIGS. 7 and 8) and a retaining position (see in particular FIG. 9). The retaining lever 40 is provided with a recess 44 in which an actuating member 46 can engage which is mounted to the slide 16.

FIG. 10 shows the guide member 18, located at the front, of the cover holder 12, the front end of the connecting rod 22 with the latching hook mounted thereto, as well as parts of the slide 16.

In the initial position shown in FIG. 10, the slide is located at the front end of the guide rail, so that the cover is in its closed position and the connecting rod 22 is pulled forward to the maximum extent. The connection between the slide 16 and the connecting rod 22 is produced by a connecting projection 50 which is arranged on the latching hook 29 and engages in a slot 52 provided on the slide 16. As can be seen in FIG. 10d, the slot, when viewed in the direction of travel from the front (on the left in the drawing) to the rear, is at first approximately horizontal and then slopes downward. In the initial position, the connecting projection 50 is located at the lower, rear end of the slot 50. In order to disengage from the slot 52, the connecting projection 50 would have to move obliquely upwards relative to the slide 16. This, however, is not possible in the state of the system as shown in FIG. 10 because the latching member 38 of the latching hook 29 supports itself inside the guide rail 14 (see FIG. 10c), so that the latching hook 29 as a whole (and thus the latching projection 38) is prevented from being shifted upwards.

Figure 10A:
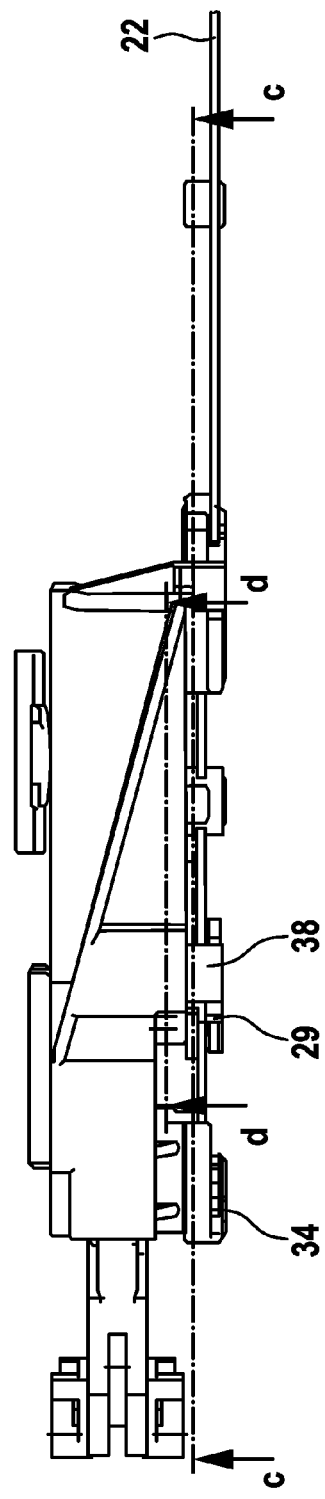
FIGS. 10a to 10d show the slide and the connecting rod in a top view, a side view and two sectional views, the sliding roof system being in the initial position with the cover closed.
Figure 10B:
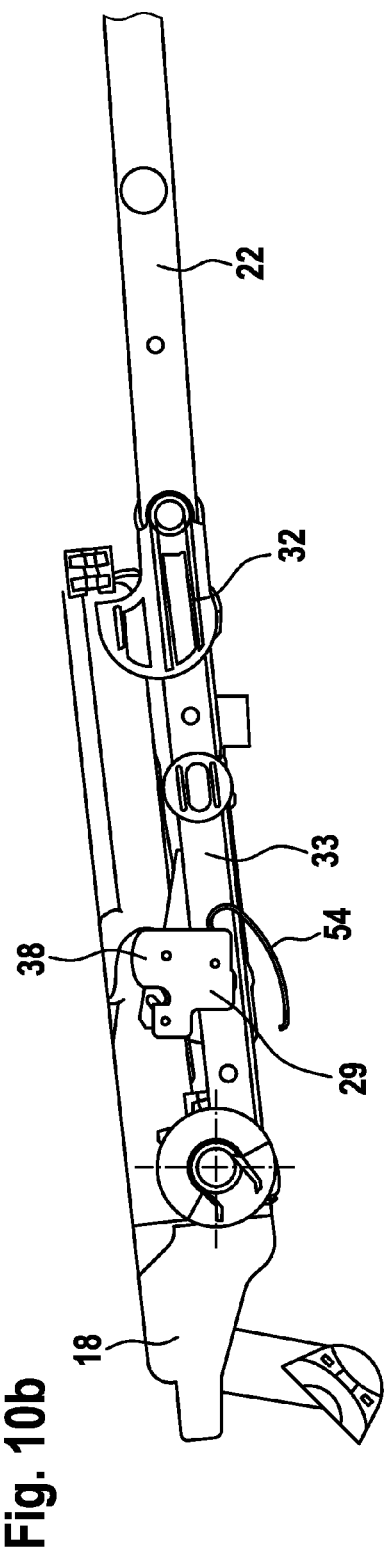
Figure 10C:
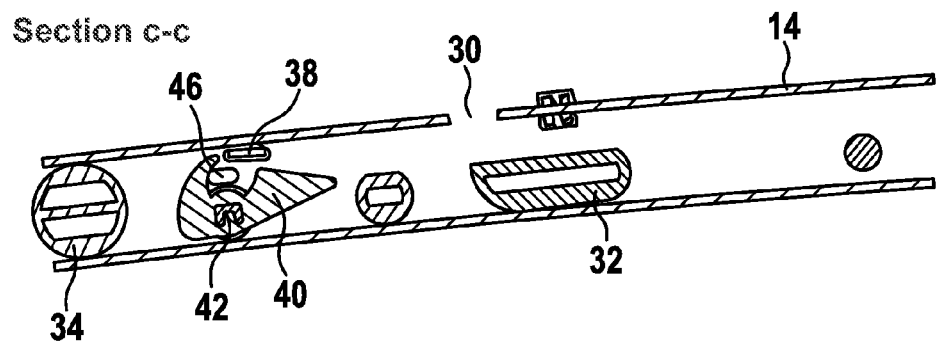
Figure 10D:
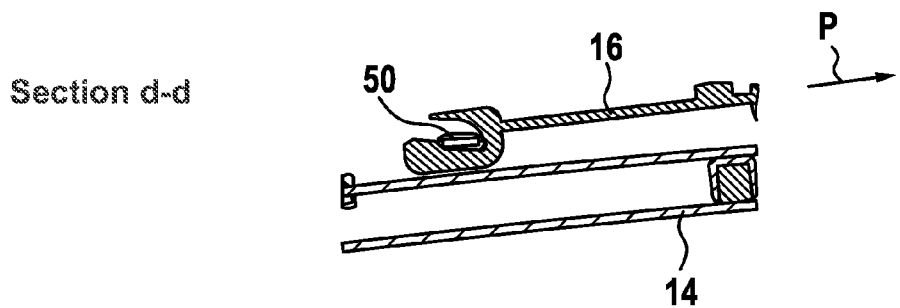
Figure 11A:
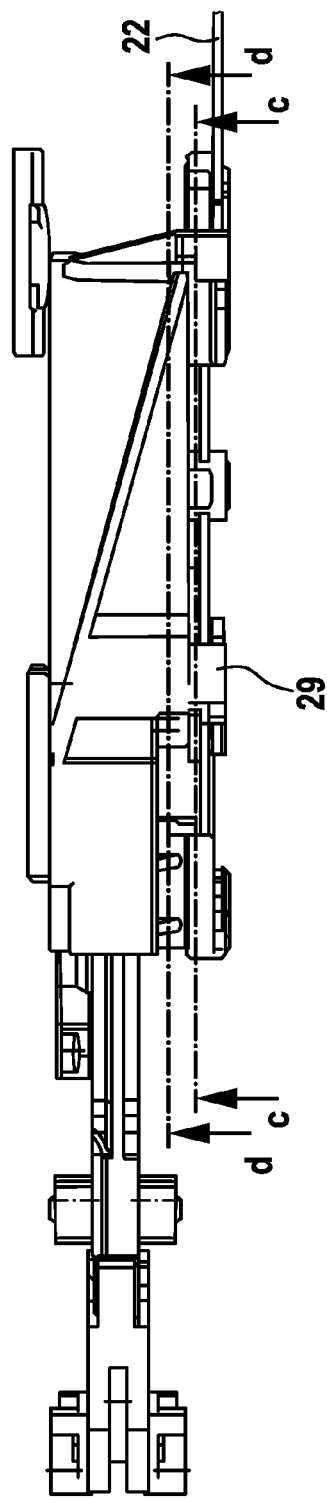
FIGS. 11a to 11d show views corresponding to those of FIG. 10 of the slide and the connecting rod, the latching hook being located at the level of the opening, associated with it, in the guide rail.
Figure 11B:
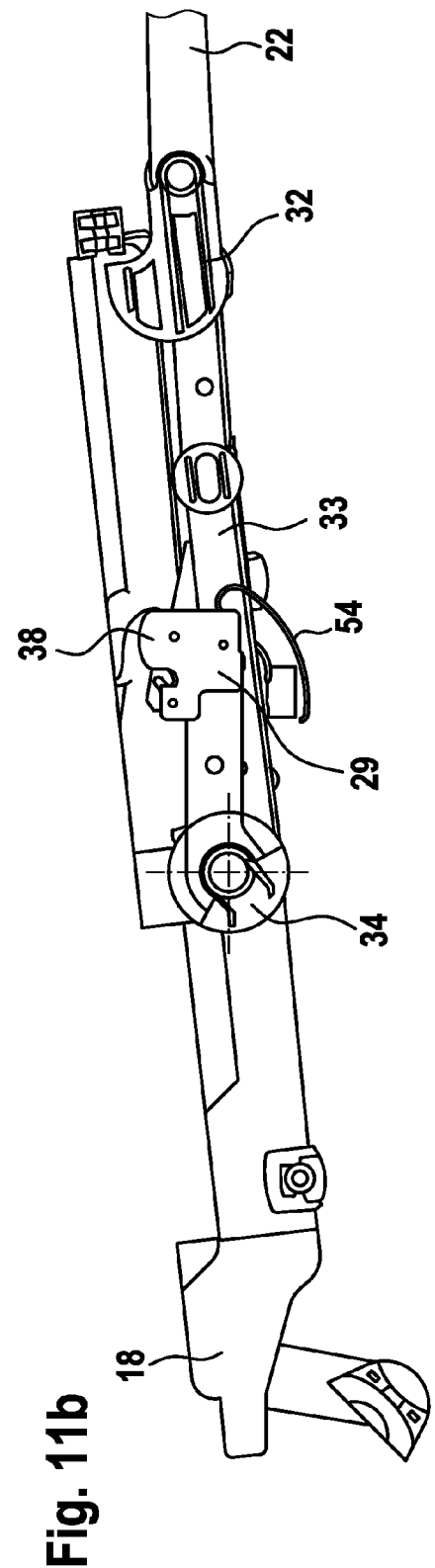
Figure 11C:
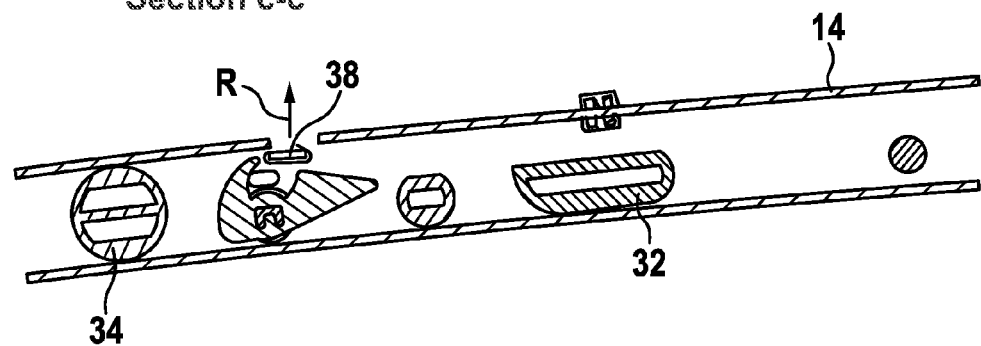
Figure 11D:
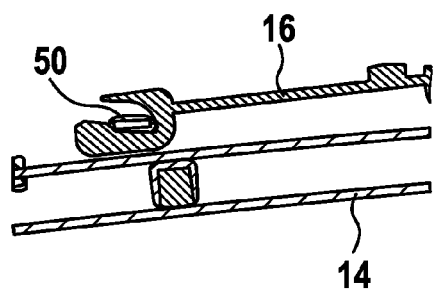
Figure 12A:
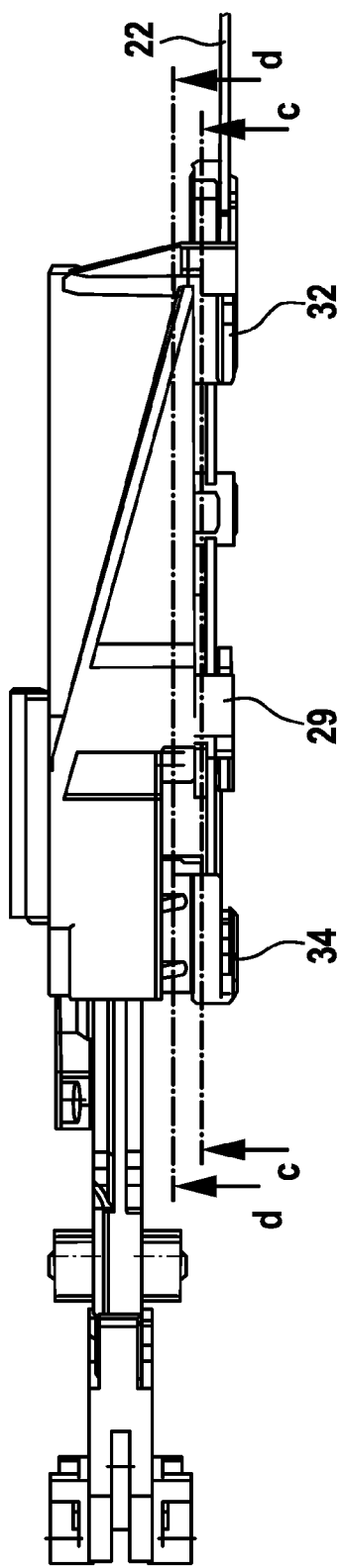
FIGS. 12a to 12d show views corresponding to those of FIG. 10 of the slide and the connecting rod, the latching hook engaging in the opening, associated with it, of the guide rail.
Figure 12B:
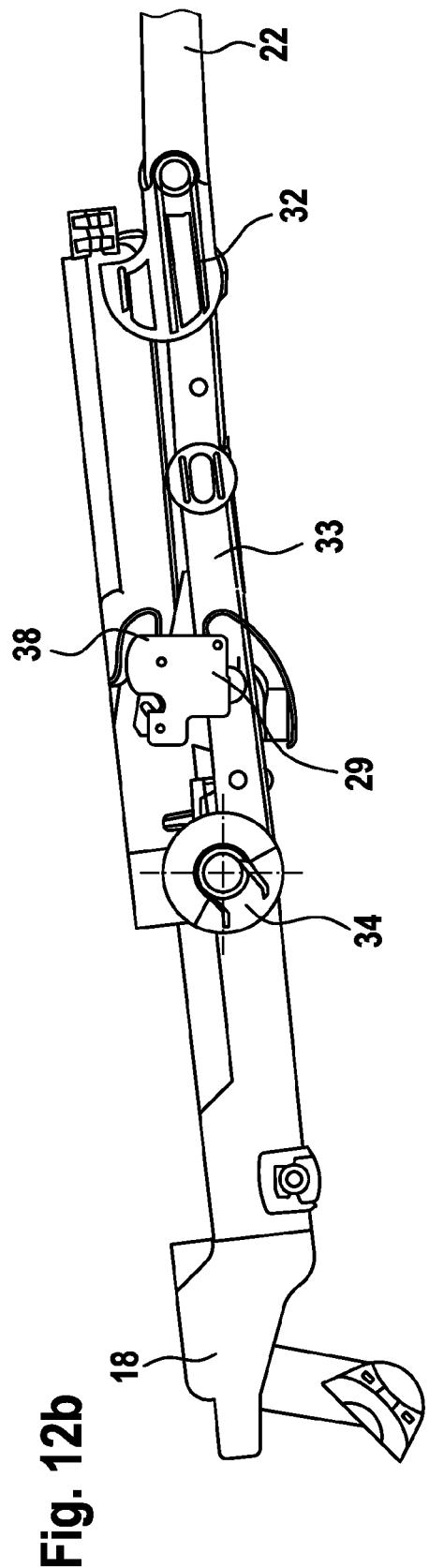
Figure 12C:
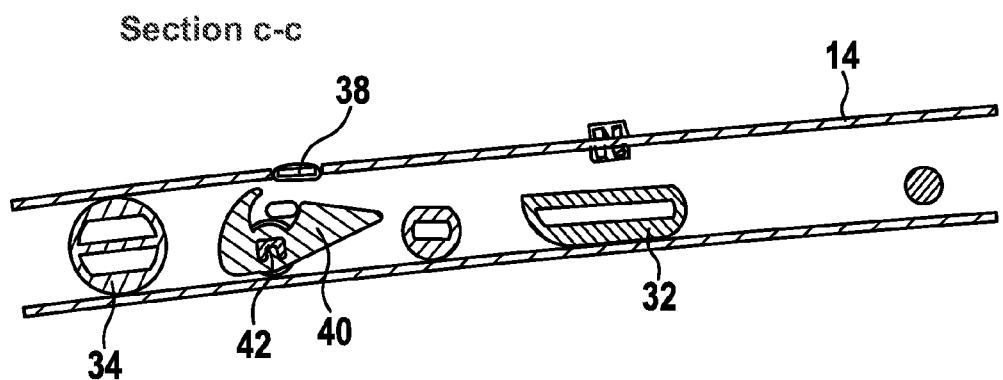
Figure 12D:
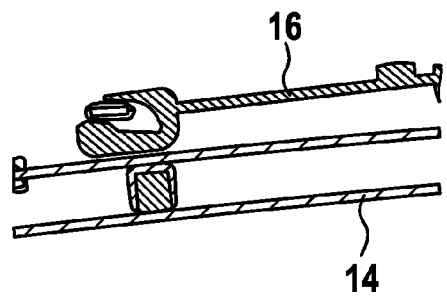

When, starting from the state shown in FIG. 10, the slide 16 is shifted to the right (that is, to the rear as related to the vehicle) in the direction of the arrow P of FIG. 10d, the slide 16, via the slot 52, exerts a tensile force directed to the right on the connecting projection 50 which cannot yield upwards and thereby entrains the connecting rod 22 to the right by means of the latching lever 29. This occurs until the latching member 38 reaches the opening 30 (see FIG. 11c), so that it is possible for the latching member 38 and thus the whole latching hook 29 to pivot from the release position upwards to the latching position (see arrow R in FIG. 11 c). This movement is assisted, firstly, by a spring 54 which urges the latching hook to the latching position, and, secondly, by the slot 52 which, upon occurrence of a tensile force between the connecting projection 50 and the slot 52, seeks to lift the connecting projection 50. As a result, the latching hook 29 is shifted to its latching position (see FIG. 12), in which the latching member 38 engages in the opening 30 of the guide rail 14. As a result of this, the latching hook 29 and the connecting rod connected to it are locked in place in the guide rail in the longitudinal direction.

Figure 13A:
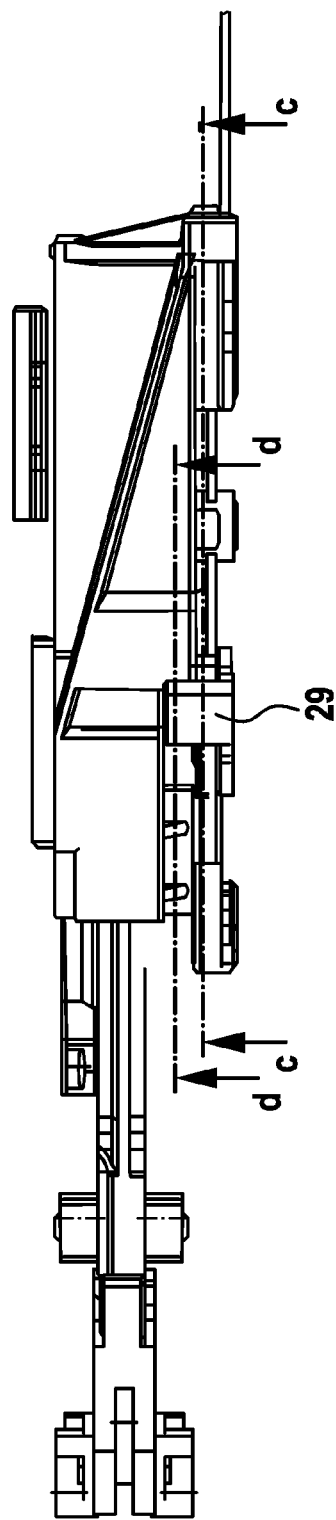
FIGS. 13a to 13e show views corresponding to those of FIG. 10 of the slide and the connecting rod, the latching hook being retained in the opening, associated with it, of the guide rail by means of the retaining lever.
Figure 13B:
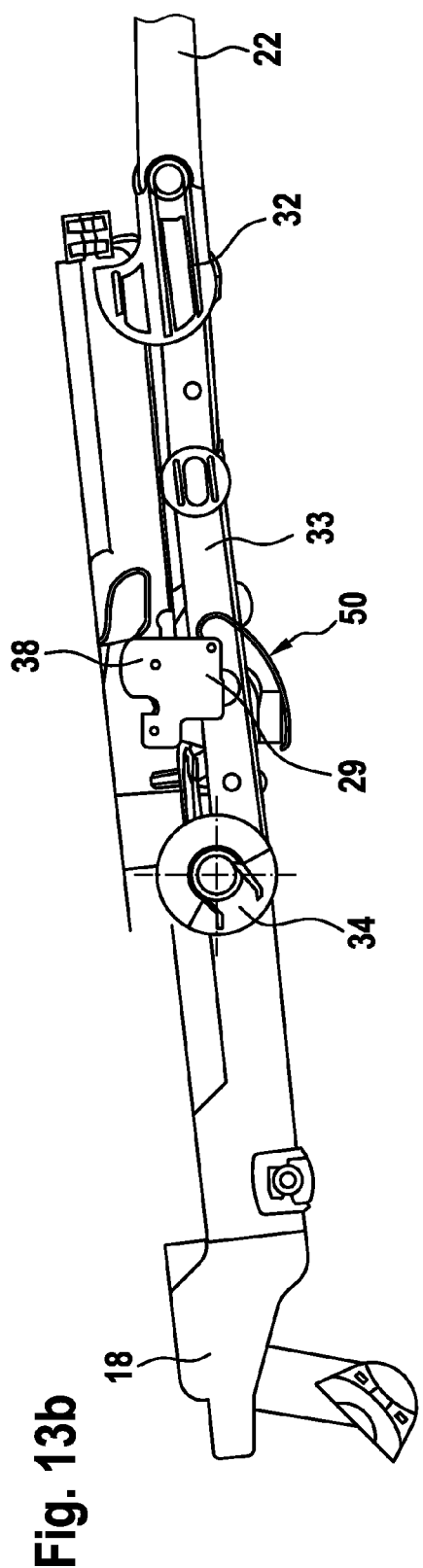
Figure 13C:
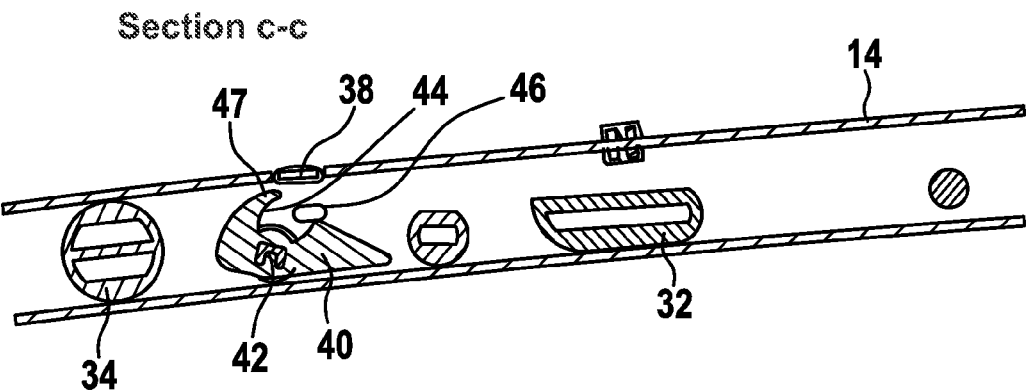
Figure 13D:
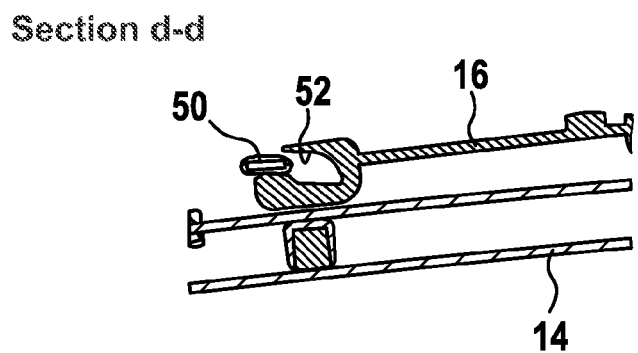
Figure 13E:
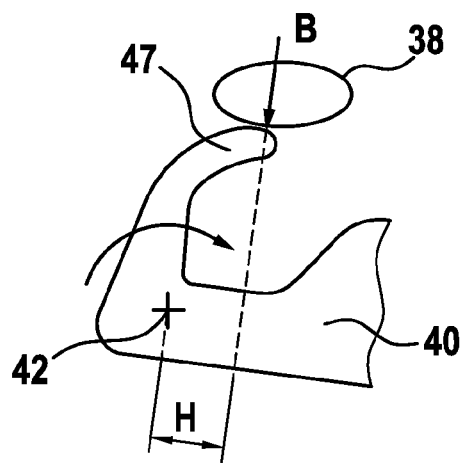

As can be seen in FIG. 13d, as a result of the upward movement of the latching hook 29, the connecting projection 50 has also traveled upward, so that it can readily leave the slot 52. In fact, the slide 16 detaches itself from the connecting projection because the slide 16 is shifted further to the right in the guide rail. This causes the actuating member 46 to come into contact with the right-hand edge of the recess 44 of the retaining lever 40, which is thereby pivoted clockwise about the pivot pin 42 from the release position (see FIGS. 10c, 11c, and 12c) to a retaining position (see FIG. 13c). In this retaining position, a support arm 47 of the retaining lever 40 lies below the latching member 38. Here, the pivot axis 42 of the retaining lever 40 is arranged in relation to the contact point B between the latching member 38 and the support arm 47 such that a lever arm H is obtained (see FIG. 13e) by means of which the retaining lever 40, in the event of a contact force of the latching hook 29 against the retaining lever 40, urges the latter to the retaining position. This reliably prevents an unintentional disengagement of the latching hook 29 from the opening 30. The slide 16 can then be further shifted in the guide rail 14 to the right as related to the Figures while the front end of the connecting rod 22 is held reliably locked in place in the guide rail by means of the latching hook 29 and the retaining lever 40.

To close the cover again, the slide 16 is moved forward, that is, to the left as related to FIGS. 10 to 13. In the process, first the connecting projection 50 moves into the slot 52 while at the same time the actuating member 46 moves into the recess 44 of the retaining lever 40 and pivots the latter back to the release position. Subsequently, when the slide 16 is shifted further to the left, the connecting projection 50 is pushed downward within the slot 52, as a result of which the latching member 38 of the latching hook 29 is shifted downward out of the opening 30. Then the slide 16 pushes the latching hook 29 further to the left by means of the connecting projection 50, whereby the latching hook 29 entrains the connecting rod 22 and the entire sliding roof system eventually returns to its initial condition with the cover closed.

Owing to the articulated connection between the connecting rod 22 and the extension 33, no moment can be transferred from the connecting rod 22 to the extension 33 and thus to the latching lever when there is a change in the direction of movement. In combination with the retaining lever, this results in a particularly high reliability of the latching of the system in the latching opening of the guide rail.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sliding roof system comprising:
   a pair of guide rails;
   a slide in each guide rail, the slide being displaceably mounted therein;
   a functional component which is displaceably received in at least one of the pair of guide rails and can be fixed in a raised position by means of a latching hook, the latching hook being shiftable between a release position and a latching position, the latching hook when in the latching position engaging in an opening of the at least one of the pair of guide rails, and
   a cover which can be opened from a closed position by displacement of the slide;
   a retaining lever being provided which can mechanically hold the latching hook in the latching position, wherein the retaining lever is adapted to be pivoted vertically about a pivot pin between a released position and a retaining position.

2. The sliding roof system according to claim 1, wherein the slide has an actuating member provided thereon which cooperates with the retaining lever such that it can shift the retaining lever between the release position and the retaining position and back.

3. The sliding roof system according to claim 1, wherein the retaining lever includes a support arm which is associated with the latching hook and is arranged in relation to the pivot pin such that a force exerted on the support arm by the latching hook urges the retaining lever to the retaining position.

4. The sliding roof system according to claim 1, wherein the roof system is configured such that the retaining lever is acted upon by a frictional force, so that it does not unintentionally rotate from the retaining position to the release position, and vice versa.

5. The sliding roof system according to claim 2, wherein the actuating member is a projection which can engage in a recess of the retaining lever and can leave the recess when the retaining lever is in the retaining position.

6. The sliding roof system according to claim 1, wherein the opening in the at least one of the pair of guide rails is located on a side facing the cover.

7. The sliding roof system according to claim 1, wherein the latching hook is pivotally mounted to a guide part which is displaceably received in the at least one of the pair of guide rails.

8. The sliding roof system according to claim 7, wherein the functional component is coupled to the guide part.

9. The sliding roof system according to claim 8, wherein a connecting rod is provided which couples the functional component to the guide part.

10. The sliding roof system according to claim 7, wherein a connecting rod is provided which couples the functional component to the guide part.

11. The sliding roof system according to claim 6, wherein the latching hook is pivotally mounted to a guide part which is displaceably received in the at least one of the pair of guide rails.

12. The sliding roof system according to claim 11, wherein the slide has an actuating member provided thereon which cooperates with the retaining lever such that it can shift the retaining lever between the release position and the retaining position and back and wherein the actuating member is a projection which can engage in a recess of the retaining lever and can leave the recess when the retaining lever is in the retaining position.

13. The sliding roof system according to claim 12, wherein the roof system is configured such that the retaining lever is acted upon by a frictional force, so that it does not unintentionally rotate from the retaining position to the release position, and vice versa.

14. The sliding roof system according to claim 13, wherein the retaining lever includes a support arm which is associated with the latching hook and is arranged in relation to the pivot pin such that a force exerted on the support arm by the latching hook urges the retaining lever to the retaining position.

15. The sliding roof system according to claim 14, wherein the slide has an actuating member provided thereon which cooperates with the retaining lever such that it can shift the retaining lever between the release position and the retaining position and back.

16. The sliding roof system according to claim 15, wherein the functional component is coupled to the guide part.

17. The sliding roof system according to claim 16, wherein a connecting rod is provided which couples the functional component to the guide part.

18. The sliding roof system according to claim 11, wherein the slide has an actuating member provided thereon which cooperates with the retaining lever such that it can shift the retaining lever between the release position and the retaining position and back.

* * * * *